Oct. 25, 1955  N. F. ANDREWS ET AL  2,721,557
CORN HUSKING MECHANISM
Filed Oct. 17, 1951  4 Sheets-Sheet 1

INVENTORS
N.F. Andrews & R.L. Dort
BY C.T. Parker and
Attorneys

Oct. 25, 1955

N. F. ANDREWS ET AL 2,721,557

CORN HUSKING MECHANISM

Filed Oct. 17, 1951

INVENTORS
N.F. Andrews & R.L. Dort
BY C.T. Parker and
Hall Booth
Attorneys

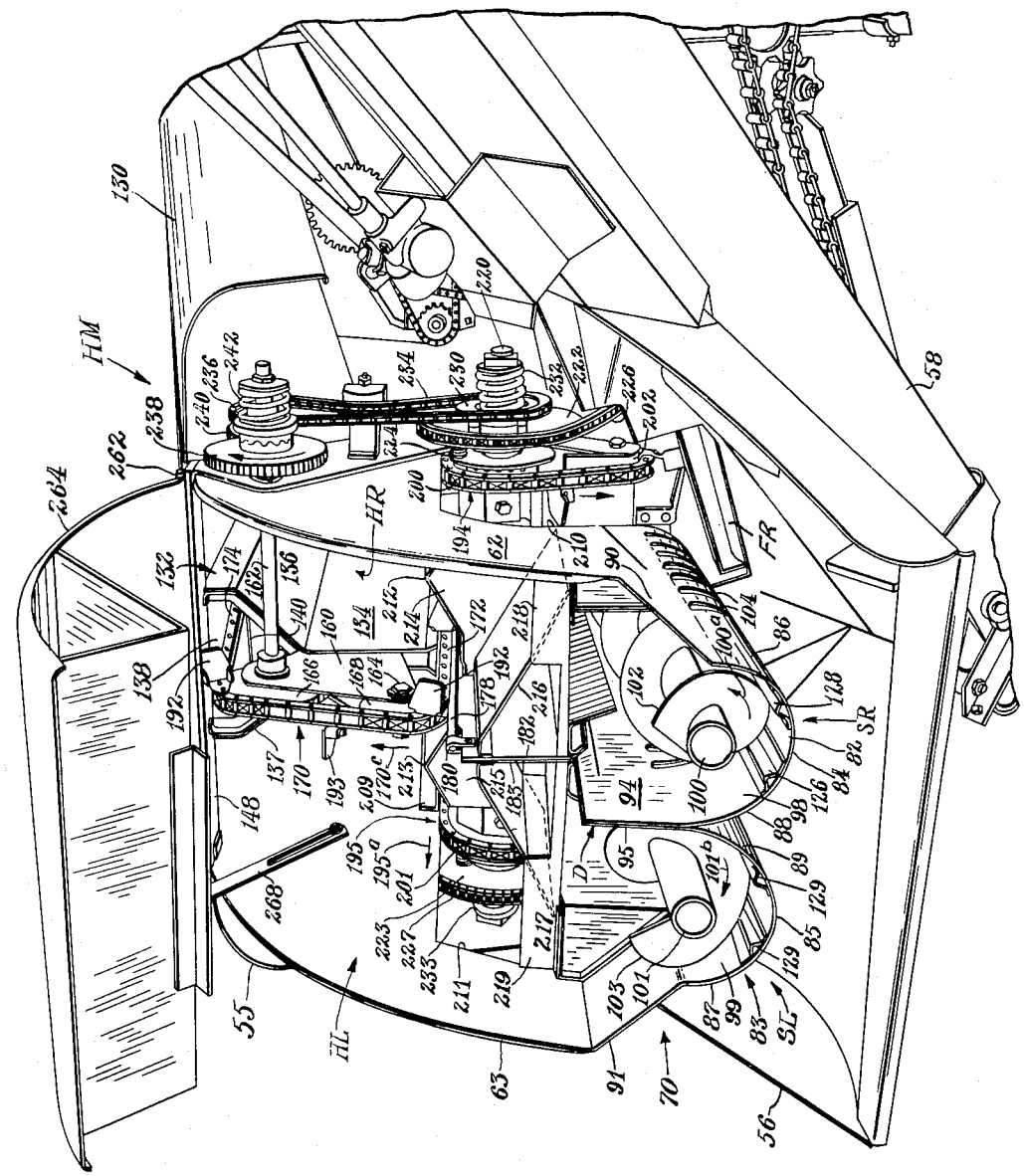

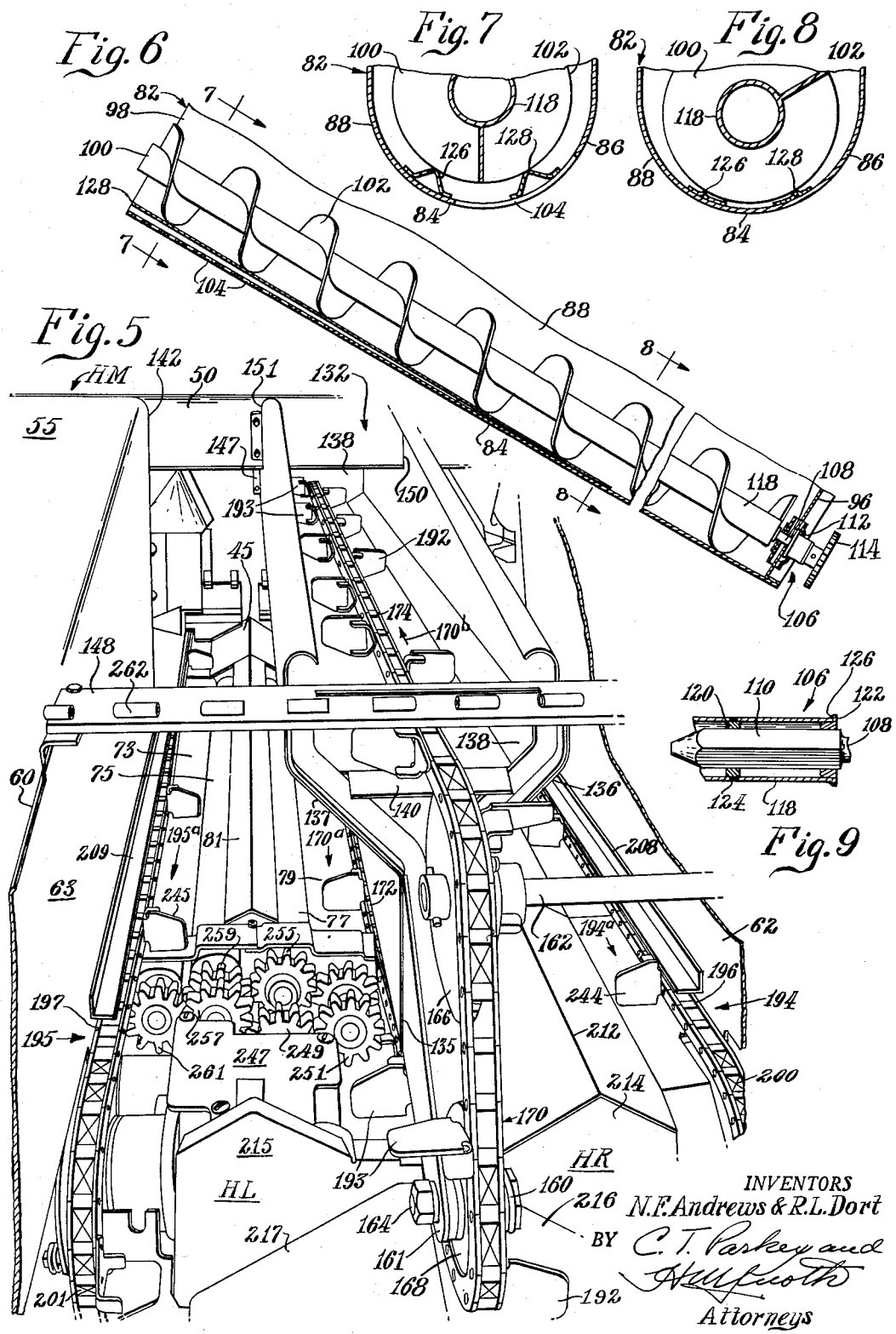

United States Patent Office 2,721,557
Patented Oct. 25, 1955

2,721,557

CORN HUSKING MECHANISM

Norman F. Andrews, Ankeny, and Russell L. Dort, Davenport, Iowa, assignors to Deere Manufacturing Co., Dubuque, Iowa, a corporation of Iowa Application October 17, 1951, Serial No. 251,746

16 Claims. (Cl. 130—5)

This invention relates generally to corn husking mechanism and more particularly to improved corn husking mechanism especially designed for use in a mobile corn picking machine of the two-row type.

In any husking mechanism, whether it be a separate unit or part of a corn picker, the problems presented are substantially the same. These involve largely the moving of unhusked ears of corn over husking devices for effecting the separation of husks from the ears and the separate discharge of husks and ears. Normally there will be a considerable amount of shelled corn incident to the husking operation. Another problem occurs because of the necessity for separating husks from the shelled corn so as to save the latter while discharging the former. Conventionally, the husking mechanism will comprise a husking box in which are provided a plurality of husking devices such as cooperating rolls. The unhusked ears are fed lengthwise over the rolls and the rolls operate to strip the husks from the ears to discharge the husks downwardly to a husk-receiving means in which some form of conveyor moves the husks to a point of discharge. Since shelled corn is intermingled with the husks, the husk-receiving means must have some kind of mechanism for separating the shelled corn. Normally, this mechanism will include merely a perforated bottom in the husk-receiving means so that the shelled corn is permitted to sift therethrough.

Although the foregoing fundamentals are fairly well known to designers, it is not always a simple matter to achieve maximum operating efficiency with a simple design. For example, the husking rolls themselves are normally not sufficient to move the unhusked ears through the husking box from the receiving end to the discharge end thereof. Therefore, some form of agitating or conveying means must be utilized. These may take many different forms, as they have in the past, the idea being to keep the ears moving and to maintain as much contact as possible between the ears and the rolls so that the maximum percentage of husks is removed.

The foregoing problems are considerably increased in the case of a corn picker of the multi-row type, since the husking mechanism must accommodate quite a volume of corn. It has heretofore been conventional to provide separate husking mechanisms for the several row units. Naturally, this results in excess duplication of parts, besides increasing the over-all size of the machine.

According to the present invention, it is an object to provide an improved husking mechanism, especially adapted for a multi-row corn picker, in which a pair of husking units is arranged side by side with a common conveyor or agitator operating centrally between the two. It is a further object to partition the husking devices at one side of the conveyor from those at the other side, and to so design the partition that the conveyor has portions operating respectively at opposite sides of the partition so as to handle corn ears in both husking units. The invention has for a further object the utilization of a so-called undershot conveyor as the central or common conveyor, in which conveyor the lower run operates over the husking devices from the receiving end to the discharge end of the husking box and the return run operates in spaced relation above the husking devices. It is a feature of the invention to enclose the return run of the conveyor so as to avoid interference with corn ears moving from the receiving end to the discharge end of the husking box.

It is generally an object of the invention to minimize the transverse extent or width of the husking box consistent with the efficiency of the mechanism. To this end, there are utilized several pairs of husking rolls arranged in two sets, preferably two pairs of rolls in each set. The sets are divided by the partition means mentioned above and the central conveyor operates in common over the inner pair of each set of husking rolls or equivalent devices. A pair of outer conveyors, one for each set of husking devices, is utilized, each of these being preferably of the overshot type in which the upper run operates over the respective outer pair of the respective husking roll set. The husking mechanism itself is made relatively narrow, yet is of sufficient volume and capacity to handle the husks and shelled corn resulting from the husking operation. The narrowing of the husk-receiving means relative to the husking box enables the lower runs of the outer conveyors to travel below the husking box and within the planes of the upright outer sides of the husking box.

Further objects of the invention reside in the supporting of the central conveyor on the central partition means; and, generally, the over-all improvement of the husking mechanism, whether it be adapted for use by itself or as a component of a complete corn picking machine.

The foregoing and other important objects and desirable features inherent in and encompassed by the invention will become apparent as a preferred embodiment of the invention is disclosed in the following detailed description and accompanying sheets of drawings wherein Figure 1 is a plan view of a two-row corn picker embodying the improved husking mechanism, certain exterior portions of the husking mechanism covers or shields being omitted to disclose the interior parts;

Figure 4 is a fragmentary enlarged perspective view as seen generally in the direction of the arrow bearing the encircled numeral 4 in Figure 1, the rear enclosure of the husking box being opened to expose the interior;

Figure 5 is a fragmentary perspective view, substantially on the same scale as that used in Figure 4, and illustrating the interior of the husking mechanism as seen in the direction of the arrow bearing the encircled numeral 5 in Figure 1, portions of one unit being omitted to disclose underlying structure;

Figure 6 is a longitudinal sectional view, on an enlarged scale, through one of the husk augers;

Figure 1:
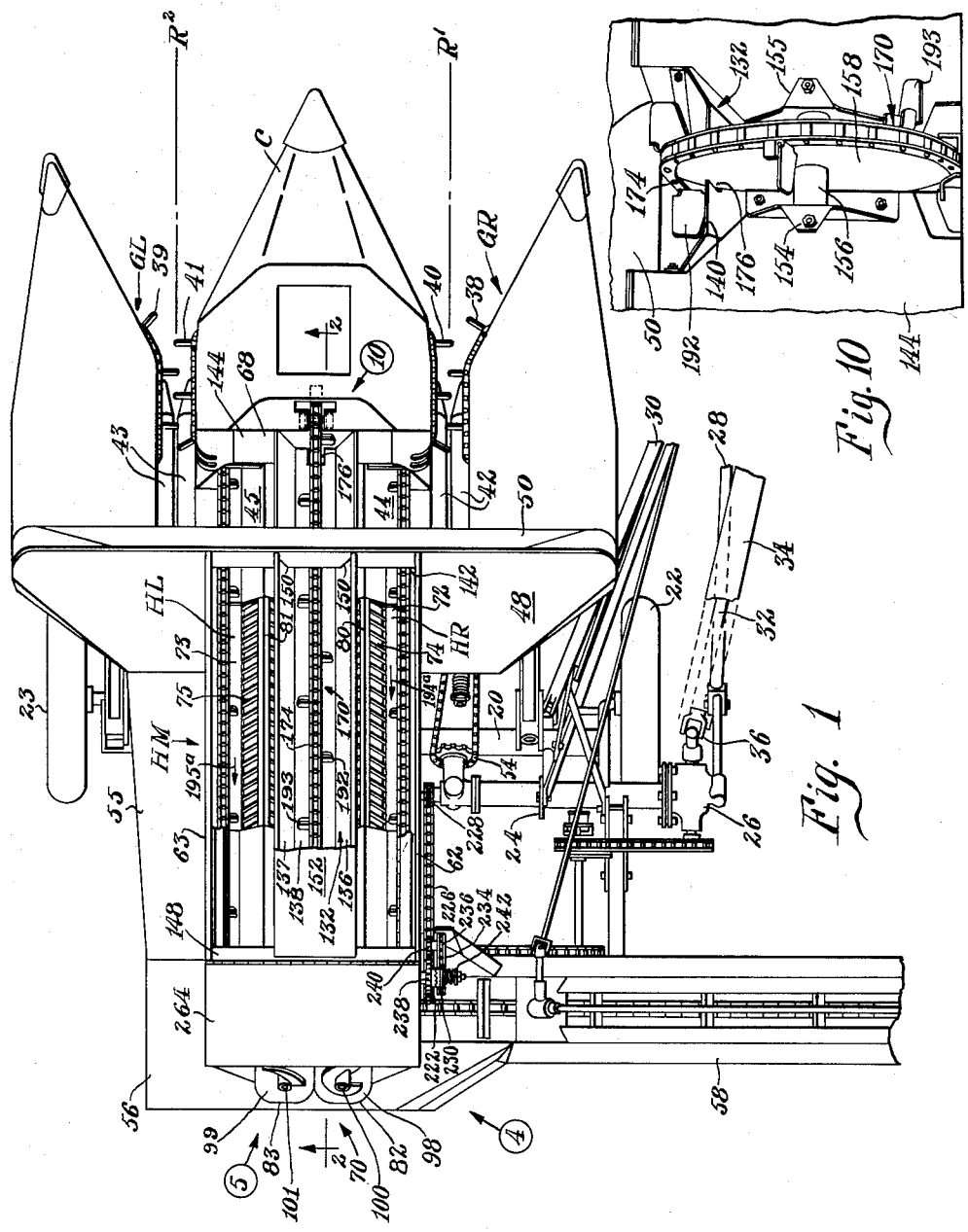

Figures 7 and 8 are transverse sectional views, each on an enlarged scale, as seen along the lines 7—7 and 8—8 respectively of Figure 6;

Figure 9 is a fragmentary sectional view showing the disconnectible driving means between the front end of the auger and its input shaft; and Figure 10 is a fragmentary perspective view on an enlarged scale as seen generally in the direction of the arrow bearing the encircled numeral 10 in Figure 1.

Although the preferred form of husking mechanism illustrated is especially adapted for a corn picker of the two-row type, the principles involved will be applicable to other husking mechanisms. Throughout the description and claims, reference will be had to these parts as bearing certain positional and directional relationships to each other. These terms are used for convenience only and are not intended to impart any limitations into the claims not otherwise required. The use of terms such as "right" and "left" is made with respect to the position of an observer standing behind the machine and looking forwardly.

The basic corn picker structure illustrated is similar to that shown in U. S. Patent 2,494,080 and is of the two-row, pull-behind type. That is to say, the picker is adapted to be drawn by a tractor, for example, and operates simultaneously on two adjacent corn rows. Only those parts of the picker deemed necessary to an orientation of the present invention have been disclosed here.

The picking machine comprises a transverse frame structure in the form of a tubular axle 20 carried by right- and left-hand wheels 22 and 23. At the right-hand side of the machine is additional framework 24 including a gear housing 26. The machine is drawn behind a tractor, for example, by forwardly extending draft tongue means including inner and outer hitch parts 28 and 30, and power from the power take-off shaft (not shown) of the tractor may be transmitted by a propeller shaft 32 housed within a tubular member 34 carried by the draft tongue means and connected by a universal joint 36 to suitable mechanism (not shown) contained in the gear housing 26.

The wheels 22 and 23 are spaced sufficiently far apart to span a pair of corn rows $R^1$ and $R^2$, and centered respectively over these rows are right- and left-hand picking and gathering mechanisms GR and GL. These are separated by a central divider C in a generally conventional manner.

The right-hand mechanism GR includes a pair of gathering chains 38 and 40 which move rearwardly to impel standing stalks through a pair of snapping rolls 42. Ears snapped from the stalks are transferred laterally inwardly to what may be termed a first-elevator pan 44 for ultimate transfer rearwardly to husking mechanism designated generally by the legend HM and comprising right- and left-hand husking units HR and HL, one unit being provided for each of the gathering and picking mechanisms.

The left-hand gatherer GL has operating parts similar to those just described for the right-hand mechanism GR. For purposes of convenience, these are described by odd reference numerals respectively following the even numerals used for the right-hand mechanism.

Figure 2:
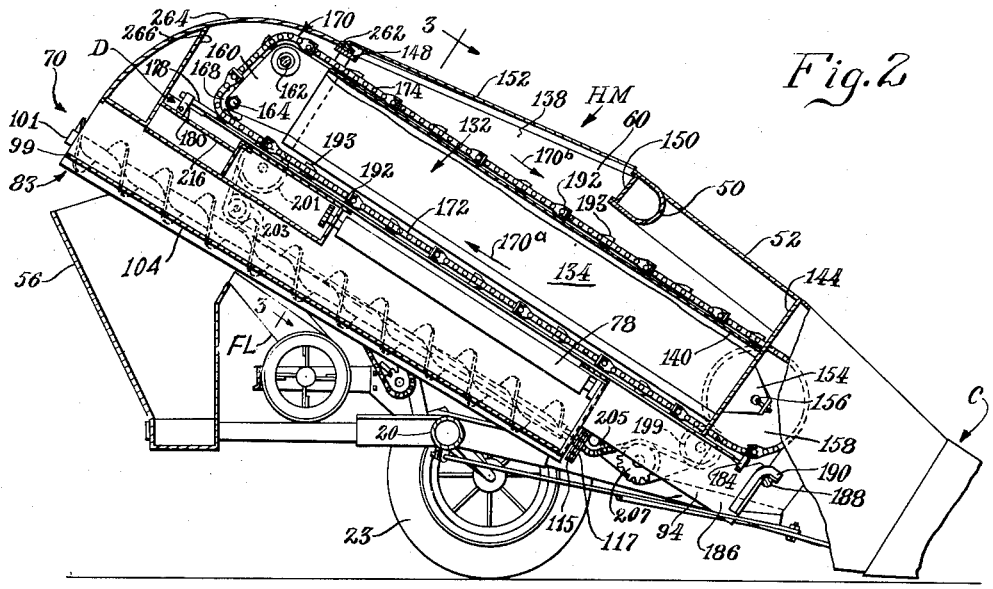
Figure 2 is a longitudinal sectional view as seen substantially along the line 2—2 of Figure 1.

The husking mechanism HM is separated generally from the forward part of the machine comprising the right- and left-hand gathering means GR and GL and the center divider C by what may be termed a transverse wall 48 including a transverse brace or support 50 that is preferably of channel section (Figure 2). Normally, the space ahead of the wall 48 and over the first-elevator pans 44 and 45 will be covered, as shown in Figure 2 at 52. In Figure 1, the cover 52 has been omitted to expose the first-elevator pans 44 and 45 and other mechanism in addition thereto.

The operating parts of the mechanism GR may be driven in any suitable manner from power transmitted to the gearing in the gear housing 26 by the propeller shaft 32, as by means of a sprocket and chain drive 54 shown in Figure 1. The mechanism GL may be driven by a similar connection, not shown, covered in Figure 1 by a shield 55. These details are not important here and are referred to generally only for purposes of orientation.

The husking mechanism HM ultimately discharges ears and shelled corn to a hopper 56 with which is associated an upwardly and laterally inclined wagon elevator 58. Representative structure of this nature is shown in the patent referred to above.

As previously stated, the husking mechanism HM includes the right- and left-hand units HR and HL. As will become apparent, these may be provided as separate units assembled in side-by-side relationship; or the entire structure may be embodied as a single unit utilizing the principles to be described.

The husking mechanism comprises generally a husking box 60 having right- and left-hand upright sides 62 and 63, a top 64 and a bottom 66. The husking box also has a forward or receiving end 68, in the zone of the first-elevator pans 44 and 45, and a rear or discharge end 70. The rear end, as will be brought out hereinafter in greater detail, is associated with the hopper 56 for effecting the discharge into the hopper of husked ears and shelled corn for transfer by the wagon elevator 58 to a wagon or equivalent vehicle (not shown) conventionally used with the picker.

Figure 3:
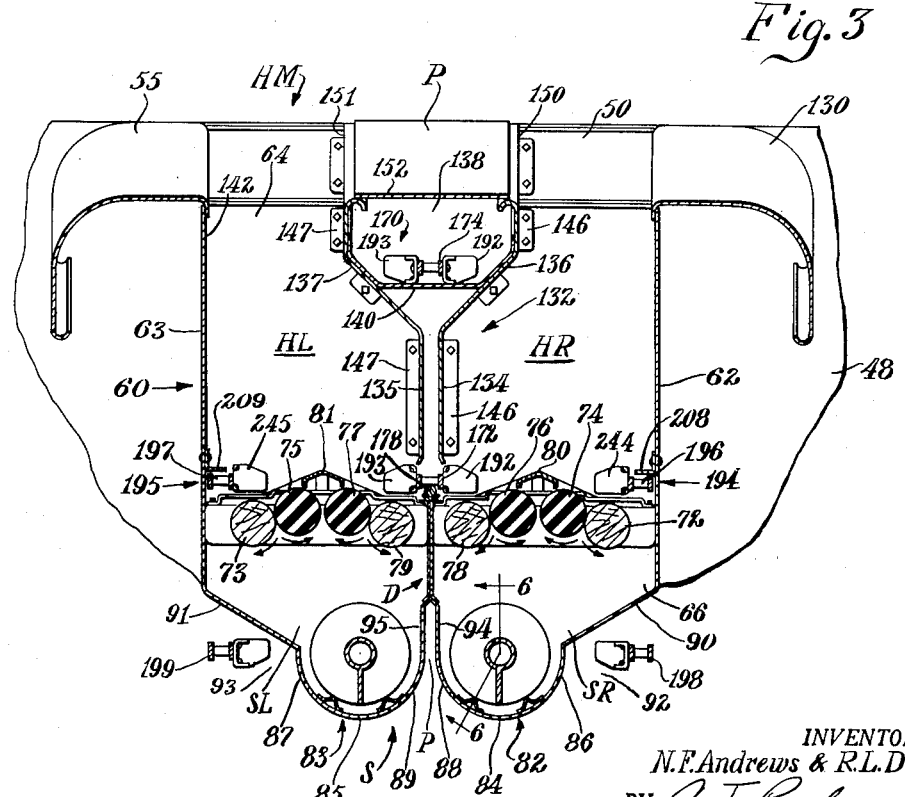
Figure 3 is a transverse sectional view, on an enlarged scale, as seen substantially along the line 3—3 of Figure 2.

The right-hand husking unit includes a set of husking devices in the form of a plurality (here four) of elongated husking rolls 72, 74, 76 and 78, rotatable respectively in the directions of the arrows shown in Figure 3. The rolls 72 and 74 comprise a cooperative outer pair or set adjacent to the interior of the right-hand upright wall 62. The rolls 76 and 78 comprise a second cooperative or inner pair or set adjacent to and at one side of a longitudinal median plane PP through the husking box (Figure 3).

The left-hand unit includes a similar plurality of husking devices, also in the form of rolls 73, 75, 77 and 79. The rolls 73 and 75 comprise a cooperative outer pair or set adjacent to the interior of the upright left-hand wall 63 and the rolls 77 and 79 comprise an inner pair or set adjacent to the other side of the median plane PP. All the rolls togetehr form a husking bed below the level of the top 64 of the husking box and above the bottom 66 of the husking box. As is conventional, the rolls are arranged in vertically offset planes to facilitate husking. One roll of each pair is preferably of rubber and the other roll of each pair may be of wood. In the present case, the rolls 74, 76, 75 and 77 are the rubber rolls and the other rolls are the wooden rolls. The rubber rolls are somewhat higher than the wooden rolls, as will be seen in Figure 3.

The pair of rolls 72—74 is separated from the pair of rolls 76—78 by a longitudinally running inverted channel 80 and a similar separator 81 is utilized between the pairs of rolls 73—75 and 77—79. These channels serve to separate incoming corn into laterally spaced streams to be handled respectively by the pairs of rolls.

The set of rolls at the right-hand side of the husking mechanism is separated from the set at the left-hand side by divider means D that extends substantially from the level of the tops of the rolls to a point below the rolls. It is a feature of the present invention that the divider means D serves also as means for partitioning husk-receiving means S into right- and left-hand husk-receiving compartments SR and SL respectively below the sets of rolls in the right- and left-hand husking units HR and HL.

The right-hand means SR comprises an elongated trough 82 of elongated U-shaped cross section so that the trough is provided with contiguous bottom and side portions 84, 86 and 88. These contiguous portions form substantially a semicircle and the side wall portion 86 adjoins an upwardly and laterally outwardly inclined wall 90 that ultimately joins the bottom of the right-hand side wall 62. Thus the lower portion of the receiving means SR is substantially narrowed relative to the distance between the median plane PP and the right-hand side wall 62, thus affording a lower outer space or recess 92, the purposes of which will presently appear.

The inner side wall portion 88 of the trough 82 continues upwardly at 94 to form part of the divider means D. Thus, the right-hand receiving means SR affords substantially a complete enclosure directly below the husking rolls 72, 74, 76 and 78 in the right-hand husking unit HR.

The left-hand receiving means SL is symmetrically constructed as respects the right-hand means SR. In the interests of brevity, a detailed description of the left-hand means SL will be omitted, but the construction thereof may be understood by noting that the reference characters applied thereto are odd numbers respectively following the even numbers used in the description of the right-hand means SR. It will be observed, however, that the left-hand trough 83 has an inner side wall portion 95 cooperating with the inner side wall portion 94 of the trough 84 to comprise the divider means D and that there is provided a space or recess 93 to the left of the trough 83, which space is comparable to the space 92 previously described.

As the machine operates, unhusked corn ears delivered to the husking mechanism HM will be separated by the husking devices or rolls into husked ears, husks and incidental shelled corn. The husking rolls operate conventionally to discharge the husks and such incidental shelled corn downwardly into the respective receiving means SR and SL. The intermingled husks and incidental shelled corn are moved rearwardly. In each instance, the trough has a closed front end and an open rear end, the latter providing for the discharge of husks. Since only the right-hand trough is illustrated in detail, reference will be had at the present primarily to Figures 6, 7 and 8, with incidental reference to Figure 4.

The right-hand trough 82 has its front end closed by a transverse end wall 96. Its rear end is open as at 98. A husk auger 100 is rotatable on an axis that lies lengthwise of the trough 82 and extends from end to end of the trough. The auger has a helical flight 102 that has its edge lying on a cylinder about the auger axis and is rotatable in direction of the arrow 100ᵃ in Figure 4 to move husks and shelled corn in the direction of the arrow 100ᵇ shown in Figure 6. The bottom portion 84 of the trough 82 is perforated at 104 adjacent its open or discharge end 98 to permit incidental shelled corn to sift therethrough as the husks and such shelled corn are moved rearwardly. Thus, the shelled corn is discharged through the perforations directly over the hopper 56 at the bottom of the wagon elevator 58. As best shown in Figure 2, the discharge ends of both troughs 82 and 83 are rearwardly beyond the rear edge of the hopper 56. In Figure 2, the open or discharge end of the trough 83 is shown at 99.

The front end of the auger 100 is supported by a combined bearing means and disconnectible drive connection designated generally by the numeral 106. This means is carried by the closed front wall 96 of the trough 82 and comprises the sole coaxial means for carrying the auger. This meas will be described in detail below, but forms the claimed subject matter of copending application Ser. No. 255,256, filed November 7, 1951.

This means includes an input shaft 108 having a coaxial element 110 of non-circular section (Figure 9). The shaft 108 is rotatable in the end wall 96 of the trough 82 by means of a bearing 112. The bearing is of such construction as to hold the shaft 108 against axial displacement. Power is supplied to the shaft 108 by means of a sprocket 114. The corresponding sprocket 115 for a similar auger 101 in the other trough 83 is shown in Figure 2, as having trained thereabout a driving chain 117 that may derive power in the first instance from the sprocket and chain mechanism beneath the shield 55 (Figure 1). These details are, of course, unimportant here.

The auger has a central tubular core 118 that is supplemented at its end proximate to the end wall 96 of the trough 82 by a pair of axially spaced rings 120 and 122. These rings are rigidly spaced in and secured to the tubular core 118 as by welding respectively at 124 and 126 (Figure 9). The openings in the rings are of non-circular section comparable to that of the part 110 of the input shaft 108 so as to fit telescopically over the part 110. Thus, the auger and the input shaft 108 have cooperative elements constrained for rotation together but permitting axial withdrawal of the auger 100 out of the open end 98 of the trough 82.

As best seen in Figure 6 and as developed in the above copending application, the bottom portion 84 of the auger trough 82 diverges rearwardly relative to the axis of the auger. Stated otherwise, the axis of the auger and the bottom portion 84 are non-parallel. The non-parallelism may be carried out relative to the side walls 86 and 88, as will appear in Figure 8. Because of this relationship, the radial spacing between at least the bottom portion 84 of the trough 82 and the edge of the auger flight 102 increases uniformly toward the rear or open end 98 of the auger trough. The auger is supported by its flight in the relationship just defined by means running lengthwise of the auger and providing a pair of longitudinal ribs 126 and 128 secured to and upstanding from the interior surface of the bottom 84 in circumferentially spaced relationship below the auger. The flight 102 of the auger thus rides on the ribs 126 and 128. The design of each rib is such that it converges relative to the bottom 84 of the trough toward the closed end of the trough. In other words the bearing edge of each rib is parallel to the axis of the auger. As will be seen in Figures 4 and 7, the higher portions of the ribs 126 and 128 are in the zone of the perforations 104. These ribs support the flight of the auger in such position as to facilitate the sifting of shelled corn through the perforations 104.

Each rib has a cross sectional shape substantially in the form of an inverted V with side flanges by means of which affixation may be achieved as by welding. Any equivalent substitute could, of course, be used.

The construction in the left-hand means SL is symmetrical as respects that just described, the auger 101 having a flight 103 wound in the opposite direction and the auger 101 rotating in the direction of the arrow 101ᵇ in Figure 4. The bottom of the trough 83 has rib means 127 and 129 respectively identical to those described at 126 and 128. The auger 101 also has a disconnectible driving connection (not shown) identical to that described in connection with the right-hand means SR.

Before proceeding further with further detailed description of the husking mechanism, it is appropriate to describe generally some of the symmetrical shielding structure making up the rear part of the picker. As previously described, a shield 55 extends between the transverse wall 48 and the rear end of the left side of the husking mechanism. A similar shield 130 (Figures 3 and 4) is provided at the right-hand side of the husking mechanism. This shield adjoins the upright side wall 62 of the husking mechanism. The shield 55 bears a similar relationship to the side wall 63 at the left-hand side of the husking mechanism. The shield 130 is omitted from Figure 1 to clarify the construction of the picker at that side, it being understood that the details of the picker below the shield 55 are symmetrically arranged relative to those at the right-hand side of the machine.

The right- and left-hand husking units HR and HL are divided by longitudinally running, upright partition means designated generally by the numeral 132. This means extends upwardly from just above the husking bed provided by the husking rolls to a point adjacent the top 64 of the husking box 60 and lies generally in the median plane PP through the box. The partition means 132 comprises right- and left-hand upright wall portions 134 and 135 closely spaced apart at opposite sides of the median plane PP. These walls extend upwardly and flare outwardly respectively at 136 and 137 to form an upper tunnel or enclosure 138. The wall portions 136 and 137 are cross connected at 140 by a floor or transverse wall just above the junction of the portions 136 and 137 respectively with the upright wall portions 134 and 135.

The transverse front wall structure 48 is open at its center as best shown at 142 in Figures 1, 3, and 5, so that the forward portion of the husking mechanism HM may extend therethrough to a transverse wall 144 that forms the rear of the central divider C. This wall is an upright wall just ahead of the first-elevator pans 44 and 45. The front portions of the side elements made up respectively of the wall portions 134—136 and 135—137 may respectively have securing flanges 146 and 147 thereon for securing by any appropriate means to the transverse wall 144. The partition means 132 extends lengthwise and centrally of the husking box 60 from the wall 144 and terminates short of the rear end 70 of the husking box, being carried at its rear end by a transverse upper cross brace 148 cross-connecting the upper portions of the side walls 62 and 63 of the husking box. As best appears in Figures 2 and 5, the extreme upper edges of the upper side wall portions 136 and 137 of the partition means 132 taper relative to the bottom edge of the partition means and meet the transverse channel member 50 at 150 and 151. Portions of the side walls 134—136 and 135—137 continue ahead to the transverse wall 144. The top of the partition means 132 may be closed by a removable cover 152, which completes the enclosure for the tunnel or enclosure means 138. Only a portion of the cover 152 appears in Figure 1, the remainder being broken away to expose the partition means 132 and other components thereof. The cover 152 has likewise been omitted from Figure 5.

The partition means 132 may be said to include those portions of the transverse front wall 144 at each side thereof. On this basis, then, the front part of the partition carries a pair of brackets 154 and 155 (Figure 10) between which is carried a short transverse shaft 156. This shaft extends across or bridges the space between opposite sides of the partition means and supports a conveyor-carrying element, here in the form of a relatively large sprocket 158. The diameter of this sprocket is such that its upper portion runs in the tunnel or enclosure 138 and its lower portion runs just above the husking bed formed by the husking rolls.

The rear portions of the walls 134 and 135 respectively carry brackets 160 and 161 between which are carried upper and lower transverse shafts 162 and 164. These shafts respectively support conveyor-carrying elements, here in the form of sprockets 166 and 168. A conveyor in the form of a flexible endless element, such as a chain or belt 170, is trained about the three sprockets 158, 166 and 168 so as to have a lower run 172 disposed centrally of and just above the husking bed and an upper run 174 in the tunnel or enclosure 138 provided at the top of the partition means 132. The spacing between the wall portions 134 and 135 of the partition means is such as to accommodate the rear portion of the front sprocket 158. The floor 140 of the tunnel 138 is notched at 176 (Figures 1 and 10) to accommodate the sprocket 158.

The conveyor 170 is of the undershot type so that its lower run 172 is active and moves in the direction of the arrow 170a in Figure 2. Thus, the return run 174 runs in the opposite direction or in the direction of the arrow 170b in the same figure. These arrows appear also in Figure 5. A single arrow 170c in Figure 4 designates the direction of movement of the conveyor 170.

It is a further feature of the invention that the divider means D that partitions the receiving means S into the two compartments SR and SL carries or affords guide or supporting means for the lower run 172 of the conveyor 170. In the preferred embodiment of the invention illustrated, this guide or supporting means takes the form of a longitudinally extending hardened rod 178 running along the top of the divider means D. This rod is shown as being secured at its rear end by a bracket 180 to upper extensions 182 and 183 respectively of the inner side walls 94 and 95 of the auger troughs 82 and 83. The mounting for the forward end of the rod 178 is shown in Figure 2 as comprising a similar bracket 184 secured to forward extensions of the divider walls 94 and 95, only the forward portion of the former appearing at 186 in Figure 2.

A transverse supporting rod 188 extends between the gatherer units GR and GL and supports the forward end of the husking mechanism HM by means of a bracket 190 carried by the forward extensions of the divider walls 94 and 95 (Figure 2).

As best shown in Figure 3, the lower edges of the partition means upright walls 134 and 135 terminate in closely spaced vertical relation above the longitudinal guide rod 178, thus affording a longitudinal opening through which may project laterally in opposite directions corn-ear-engaging means in the form of paddles 192 and 193 respectively at the right- and left-hand sides of the conveyor 170. The set of paddles 192 is arranged so that it operates over the bight between the inner pair of rollers 76—78 of the set of rolls in the right-hand unit HR. The left-hand paddles 193 have a similar relationship to the pair of rolls 77—79 of the left-hand unit HL. Thus, the conveyor 170 is centrally arranged and is common to the husking roll sets at both sides of the partition means 132. The lower edges of the partition walls 134 and 135 provide guide means for limiting upward displacement of the lower run 172 of the conveyor chain 170, as will clearly appear in Figure 3. The rod 178 not only guides the lower run 172 of the conveyor chain 170 in the sense that it supports the chain against sagging but also prevents lateral displacement of the lower run.

As the paddles 192 and 193 are carried forwardly by the return flight 174, they pass through the enclosure or tunnel means 138 and conflict between the paddles and incoming corn ears is prevented.

Another feature of the use of the undershot conveyor is that the return flight may be disposed above the husking bed, rather than below the bed. This enables the use of the two husking units in closely related side-by-side relationship, which relationship would be prevented were it necessary to provide a space therebetween to accommodate the return flight of the undershot conveyor. Further, the overshot conveyor avoids the presence of a "rat hole" at the discharge end of the husking mechanism. A "rat hole" as commonly understood is an opening through which a conveyor returns and normally there is considerable conflict between the material carried by the conveyor and the edges of the structure defining this opening. More often than not, the opening may clog if it is made as small as is seemingly possible. However, if the opening is made larger to avoid clogging, the conveyor carries material around with it, resulting in a substantial drop in conveying efficiency. According to the present invention, both of these disadvantages are eliminated at the same time.

The right-hand husking unit HR has an outer conveyor 194, which is preferably in the form of an endless flexible belt or chain of the overshot type. A similar conveyor 195 is carried in the left-hand unit HL. These conveyors run respectively proximate to the upright walls 62 and 63 and respectively have active upper flights or runs 196 and 197 and lower return flights or runs 198 and 199. The upper run 196 of the conveyor 194 operates over the bight of the outer pair of rolls 72—74 in the husking unit HR. The lower flight 198 returns in the space or recess 92 afforded by the reduction in transverse dimension of the receiving unit or means SR. The upper run 197 of the conveyor 195 travels over the bight of the outer pair of rolls 73—74 of the left-hand unit HL and the lower flight returns in the space or recess 93 afforded by the reduction of the left-hand receiving means SL. The upper runs of the conveyors 194 and 195 travel respectively in the direction of the arrows 194a and 195a. These arrows appear in Figures 1, 4, and 5.

Since the mounting of the left-hand conveyor 195 is more completely shown than that of the right-hand conveyor, reference will be had thereto for a description of its support and drive. The forward end of the conveyor 195 is trained about a sprocket 199 (Figure 2) and the rear end is trained about a pair of vertically spaced sprockets 201 and 203. A forward portion of the lower run of the conveyor 195 is trained about and supported on a pair of longitudinally spaced sprockets 205 and 207 (Figure 2). The right-hand conveyor is similarly arranged, but only the rear sprockets 200 and 202 are visible in the drawings (Figure 4).

The interior of the upright right-hand wall 62 of the husking box is provided with a longitudinally running guide in the form of an angle 208 for preventing upward displacement of the upper run 196 of the conveyor 194. The left-hand wall 63 carries a similar angle 209 for the same purposes relative to the upper run of the left-hand conveyor 195.

The side wall 62 is provided adjacent its rear end with a fairly large sized opening 210. A similar opening 211 is provided in the rear portion of the left-hand side wall 63. These openings are best shown in Figure 4. These openings provide discharge openings for corn after the corn has passed over the husking rolls, the discharge being such that the corn drops directly into the hopper 56. Since there will be a relatively small accumulation of trash and fine particles of husks mixed with the discharged corn, it is expedient to provide means for separating this finer material. Shown in the present case are a pair of blower fans FR and FL, the former having its discharge nozzle appearing in Figure 4 and the latter appearing substantially in its entirety in Figure 2. The nozzles of these fans are arranged so that the blast therefrom travels also transversely through the path taken by the shelled corn as it is discharged respectively from the perforations in the auger troughs 82 and 83. As previously stated, the husks are discharged out the open ends 98 and 99 of the husks troughs so as to drop to the ground behind the rear wall of the hopper 56. Thus, the ears and shelled corn, once separated from husks, are not commingled with such husks.

As previously stated, the right-hand unit HR has a longitudinal separator 80 in the form of an inverted V, the purpose of which is to separate the streams of corn so that the separate streams are handled by the separate pairs of husking rolls 72—74 and 76—78. The separator 80 merges adjacent the rear end of the husking box with a comparably shaped divider extension 212, which terminates at 214 in an upright wall transverse to an outwardly inclined floor 216. The floor 216 inclines outwardly in alinement with the discharge opening 210, so that corn ears ultimately reach the floor in two streams but merge on the floor to be transferred laterally through the opening 210 to the hopper 56. The rear portion of the floor 216 toward its lower end has an upstanding baffle wall 218 to prevent rearward discharge of the ears over into the open end 98 of the right-hand auger trough 82.

The left-hand unit HL has a similar separator extension 213 terminating in an upright wall 215 rising from an inclined floor 217 that extends to the left to direct ears from the left-hand unit HL through the left-hand discharge opening 211 to the hopper 56. A baffle 217 prevents ears from spilling over into the open end 99 of the husk auger trough 83.

In Figure 5, the left-hand separator extension 213 has been omitted to expose the drive gearing for the husking rolls 73, 75, 77 and 79.

The rear upper sprocket 200 for the right-hand outer conveyor 194 is carried on a shaft 220. This shaft carries a driven sprocket 222 connected by means of a conventional slip clutch 224 to the sprocket 200. A driving chain 226 is trained about the sprocket 222 and about a smaller sprocket 228 (Figure 1) that derives power in the first instance from the input mechanism contained in the housing 26.

Also carried on the shaft 220 is a third sprocket (in addition to the sprockets 200 and 222) 230. This sprocket is connected to the sprocket 222 by a conventional slip clutch 232. A chain 234 is trained about the sprocket 230 and extends upwardly and is trained about an upper sprocket 236 carried on a shaft (not visible) parallel to the shaft 162 for the upper sprocket 166 of the central conveyor 170. The shaft 162 extends outwardly through the right-hand side wall 62 and carries thereon a spur gear 238 which meshes with a pinion 240 on the shaft on which the sprocket 236 is mounted (Figure 1). A suitable slip clutch 242 is utilized to effect an overload release connection between the gear 238 and shaft 162. Similar drive means is provided at the left-hand side of the husking mechanism HM, but this drive means is not visible because of the shield 55. However, there is visible through the opening 211 a portion of a sprocket 223, a chain 227, and a slip clutch 233 corresponding respectively to the parts 222, 226, and 234 described in connection with the right-hand driving mechanism.

The conveyors 194 and 195 respectively have ear-engaging elements in the form of paddles 244 and 245.

As is best suggested in Figure 5, the shaft 220 is common to both conveyors 194 and 195 and also provides means for driving the husking rolls. The divider extension 213 is omitted in Figure 5 to expose a gear housing 247 in which is contained appropriate mechanism (not shown) for supplying power to a spur gear 249. This gear is in constant mesh with a spur gear 251 on the husking roll 79. This husking roll carries a second spur gear 253 in constant mesh with a spur gear 255 on the husking roll 77.

The driven gear 249 is also in constant mesh with one of a pair of gears 257 and 259 on the husking roll 75 for driving this roll. The gear 259 is in constant mesh with a gear 261 on the outermost husking roll 73. Thus the husking rolls are driven in the directions of the arrows shown in Figure 3. The right-hand driving mechanism, concealed by the divider extension 212, is the same as that just described.

It will be observed from Figures 2, 4 and 5 that the transverse support 148 for the rear end of the partition means 132 provides one half of hinge means 262. This hinge carries a rear closure member or cover 264 of arcuate shape as shown. The cover is closed in Figure 2 and is opened in Figure 4. When closed, the cover encloses the rear end of the husking mechanism HM. The closure has an interior upright and transverse baffle 266 which, when the cover is closed, lies against the upstanding short baffles 218 and 219 behind the inclined floors 216 and 217 respectively. Thus, the baffle 266 complements the functioning of the baffles 218 and 219 in effecting the transverse transfer of ears downwardly respectively over the floors 216 and 217 through the side openings 210 and 211 to the hopper 56.

A slotted member 268 is provided for holding the closure 264 in its opened position.

The husking mechanism HM is open at both sides of the partition means 132 so as to expose the right- and left-hand husking compartments from above. This provides ready access to the compartments when necessary. Normally, as stated above, the upper enclosure 138 is completed by the removable longitudinal cover 152, which lies longitudinally intermediate the side shield structures 55 and 130.

In operation, the machine is drawn forwardly over a field to gather corn from the rows R¹ and R². The gathering chains 38 and 40 and 39 and 41 move the stalks rearwardly as previously stated to the snapping rolls 42 and 43, whence the corn moves respectively inwardly to the first-elevator pans 44 and 45. The lower portions of the upper runs of the conveyors 194 and 195 and the paddles 192 and 193 respectively at opposite sides of the central conveyor 170 act in the first instance to move the corn from the elevator pans 44 and 45 and to transfer this corn rearwardly over the respective pairs of husking rolls. The pans 44 and 45 are, of course, divided by forward portions of the partition walls 134 and 135. All three conveyors serve therefore as first elevators and also as means for advancing the corn over the husking rolls. Inasmuch as the central conveyor 170 is common to both units, the sheer number of conveyors conventionally used in husking mechanisms is considerably reduced. Further, since the conveyor 170 is of the undershot type, no provision need be made for the return run below the husking assembly. Consequently, the over-all width of the husking mechanism may be considerably reduced. The reduction in transverse extent of the husk-receiving means S affords the two spaces or recesses 92 and 93 for receiving the lower runs 198 and 199 respectively of the outer conveyors 194 and 195.

Other features not specifically enumerated above will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. Corn husking mechanism, comprising: an elongated housing having a pair of spaced apart upright side walls; two sets of husking rolls, one set at each side of the longitudinal median plane of the housing and between said plane and the respective side wall and running lengthwise of the housing in a husking zone intermediate the top and bottom of the housing; husk-receiving means at the bottom of the housing and below the sets of rolls; upright divider means in said median plane and separating the husk-receiving means into two lower side-by-side compartments, one below each set of rolls, said divider means extending upwardly in said median plane and between the sets of rolls to form a lower partition between the innermost roll of one set of rolls and the proximate innermost roll of the other set of rolls, said partition having an upper longitudinal edge portion substantially at the level of the tops of said innermost rolls; a central, longitudinally running endless belt-type conveyor having a lower active run and an upper return run and arranged in said median plane with said lower run traveling over said upper edge portion of the lower partition and with said upper run spaced above the rolls; means forming an upper longitudinal partition in said median plane extending vertically between said upper and lower runs and separating the housing above the rolls into a pair of upper side-by-side compartments, said upper partition having a lower longitudinal edge spaced above the upper edge of the lower partition to accommodate the lower run of the conveyor; and means secured to each side of the central conveyor and projecting laterally into the respective compartment to operate over the respective set of rolls.

2. The invention defined in claim 1, further characterized in that: the means secured to each side of the central conveyor comprises longitudinally spaced, laterally projecting paddles; and the upper portion of said upper partition comprises a longitudinal tunnel receiving and forming an enclosure for at least the side portions of the upper return run of the central conveyor and the paddles thereon.

3. The invention defined in claim 1, further characterized in that: the upper partition comprises a double-walled structure extending longitudinally of the housing and having end portions respectively adjacent to the ends of the housing; and means is contained within said double-walled structure at said end portions for carrying the central conveyor.

4. Corn husking mechanism, comprising: an elongated housing having a pair of spaced apart upright side walls; two sets of husking rolls, one set at each side of the longitudinal median plane of the housing and between said plane and the respective side wall; each set including an inner roll proximate to said median plane and na outer roll proximate to the respective side wall; the rolls of both sets running lengthwise of the housing in a husking zone intermediate the top and bottom of the housing; central conveyor means running lengthwise of the housing on said median plane and above the rolls and having portions projecting laterally at opposite sides thereof respectively over the inner rolls of the sets of rolls, and upright double-walled longitudinal means centrally of the housing and above the rolls and forming a partition separating the housing above the rolls into two compartments, one at each side of said median plane, said double-walled structure providing a tunnel receiving said central conveyor means and having means respectively at its opposite ends supporting opposite ends of the conveyor means.

5. Corn husking mechanism, comprising: an elongated housing having a pair of spaced apart upright side walls; two sets of husking rolls, one set at each side of the longitudinal median plane of the housing and between said plane and the respective side wall; each set including an inner roll proximate to said median plane and an outer roll proximate to the respective side wall; the rolls of both sets running lengthwise of the housing in a husking zone intermediate the top and bottom of the housing; central conveyor means running lengthwise of the housing on said median plane and above the rolls and having a pair of longitudinally spaced rotary members and an endless belt trained about said rotary members, said belt having a lower active run proximate to the inner rolls of the sets of rolls and an upper return run spaced above the lower run, said conveyor including oppositely laterally outwardly projecting elements secured to the runs thereof such that the elements on the lower run operate respectively over the inner rolls of the sets of rolls; and partition means on said median plane and extending vertically between the lower and upper runs of the central conveyor means and longitudinally between the rotary members to divide the housing into two compartments, said partition means having at its upper portion a longitudinal tunnel for receiving the upper run and the elements thereon and further having respectively at its opposite ends means journalling the rotary members.

6. Corn husking mechanism, comprising: a pair of elongated husking units arranged in parallel, side-by-side relationship; each unit having upper husking devices and husk-receiving means directly below said husking devices; means providing a fixed lower upright longitudinally running central partition extending downwardly from the husking devices to separate the two husk-receiving means; means providing a fixed upper upright longitudinally running central partition extending upwardly from the husking devices to separate the husking devices of one unit from the husking devices of the other unit; said upper partition means being open along its bottom in laterally opposite directions toward the respective husking devices; and conveyor means common to the husking devices of both units and running lengthwise of the upper partition means within said opening, said conveyor means including portions projecting in laterally opposite directions respectively over the husking devices in both units.

7. Corn husking mechanism, comprising: a pair of elongated husking units arranged in parallel, side-by-side relationship; husk-receiving means below the husking devices; means providing a fixed upright longitudinally running central partition extending upwardly from the husking devices to separate one unit from the other unit; said partition means being open along its bottom in laterally opposite directions toward the respective husking devices; and conveyor means common to both units and running lengthwise of the partition means within said opening, said conveyor means including portions projecting in laterally opposite directions respectively over the husking units.

8. Corn husking mechanism, comprising: an elongated husking box having transversely spaced apart upright sides and opposite, receiving and discharge ends; first and second separate and individually effective husking devices running lengthwise substantially from one end to the other of the husking box and in side-by-side relationship respectively at opposite sides of the longitudinal median plane of the husking box, each device lying between said plane and the respective upright side; flexible endless conveyor means having a lower run traveling in said median plane from the receiving end to the discharge end of the box and immediately above the level of the husking devices, and further having an upper return run spaced above the lower run and traveling in said median plane from the discharge end to the receiving end of the box; corn-ear-engaging means on the conveyor means at both sides thereof to engage corn ears over both devices during travel of said lower run; and enclosure means running lengthwise of the box at an upper part thereof to enclose the upper run of the conveyor means for preventing the corn-ear-engaging means from engaging corn ears during return travel of said upper run.

9. The invention defined in claim 8, further characterized in that: the enclosure means includes fixed upright partition means extending lengthwise of the box in said median plane and depending from said enclosure means to a lower edge just above the lower run of the conveyor to separate the box into first and second compartments respectively for the first and second husking devices.

10. Corn husking mechanism, comprising: an elongated husking box having transversely spaced apart upright sides and opposite, receiving and discharge ends; first and second separate and individually effective husking devices running lengthwise substantially from one end to the other of the husking box and in side-by-side relationship respectively at opposite sides of the longitudinal median plane of the husking box, each device lying between said plane and the respective upright side; flexible endless conveyor means having a lower run traveling in said median plane from the receiving end to the discharge end of the box and immediately above the level of the husking devices, and further having an upper return run spaced above the lower run and traveling in said median plane from the discharge end to the receiving end of the box; corn-ear-engaging means on the conveyor means at both sides thereof to engage corn ears over both devices during travel of said lower run; and fixed partition means running lengthwise of the box in the median plane thereof and vertically between said upper and lower runs to separate the husking box into two compartments.

11. Corn husking mechanism, comprising: a pair of separate and individually effective husking devices providing a husking bed for receiving unhusked corn ears in two parallel separate streams and operative to remove husks from the corn ears and to discharge such husks downwardly through said bed; an endless flexible conveyor over the husking bed, including a lower run traveling immediately over the bed and having ear-engaging means thereon projecting over the husking devices in opposite directions transverse to said streams to engage ears on the bed and an upper return run spaced above and vertically coplanar with the lower run; and enclosure means receiving said upper run to partition said upper run against contact with ears on the bed.

12. Corn husking means, comprising: an elongated husking box; means providing a husking bed across and from end to end of the box below the level of the top of the box; a pair of supports spaced lengthwise of the box above the level of the bed; fixed partition means running lengthwise of the box centrally between the sides of the box and secured to and depending from the supports to the top of the bed for separating the box into a pair of longitudinal compartments and for dividing the bed into a pair of side-by-side husking zones; and conveying means movably carried by the partition means and having corn-ear-engaging portions for engaging corn ears in both husking zones.

13. The invention defined in claim 12, further characterized in that: the partition means includes brackets at opposite ends of the box; and the conveyor means comprises guide elements carried by said brackets, and a flexible endless conveyor belt trained about said elements and generally encircling the partition means, having a lower active run at the bottom of and an upper return run at the top of said partition means.

14. The invention defined in claim 13, further characterized in that: the bottom and top portions of the partition means include means respectively positioned to contact the lower and upper runs of the conveyor belt.

15. Corn husking mechanism, comprising: a husking bed over which corn ears are moved from a receiving end to a discharge end and which has opposite sides spaced apart transverse to the direction of movement of such corn ears, said bed including a husking device at each side of a longitudinal upright plane centrally between said sides; fixed divider means generally in said plane and separating the husking devices, and having an upper portion lengthwise of and substantially at the level of the top of said bed; and a central conveyor running lengthwise over and supported on said upper portion of the divider means and having ear-engaging portions projecting outwardly from opposite sides thereof above the divider and respectively over the husking devices.

16. The invention defined in claim 15, further characterized in that: husk-receiving means is located below the husking bed; and partition means extends downwardly from the divider means and lies generally in said central plane to separate the husk-receiving means into two compartments respectively below the husking devices.

References Cited in the file of this patent

UNITED STATES PATENTS

| | | |
|---|---|---|
| 640,961 | Sells | Jan. 9, 1900 |
| 648,484 | Chisholm et al. | May 1, 1900 |
| 718,902 | Berry | Jan. 20, 1903 |
| 998,828 | Smolley | July 25, 1911 |
| 1,147,756 | Sells | July 27, 1915 |
| 2,080,717 | Hitchcock | May 18, 1937 |
| 2,290,699 | Morral et al. | July 21, 1942 |
| 2,420,543 | Johnson et al. | May 13, 1947 |
| 2,431,016 | Andrews | Nov. 18, 1947 |
| 2,494,080 | Andrews et al. | Jan. 10, 1950 |
| 2,560,801 | Kuhlman | July 17, 1951 |
| 2,622,382 | Slavens | Dec. 23, 1952 |